(12) United States Patent
Boden

(10) Patent No.: US 9,294,410 B2
(45) Date of Patent: Mar. 22, 2016

(54) HYBRID DATAFLOW PROCESSOR

(71) Applicant: Marvell World Trade Ltd., St. Michael (BB)

(72) Inventor: Kurt Thomas Boden, Strangnas (SE)

(73) Assignee: MARVELL WORLD TRADE LTD., St. Michael (BB)

( * ) Notice: Subject to any disclaimer, the term of this patent is extended or adjusted under 35 U.S.C. 154(b) by 170 days.

(21) Appl. No.: 13/891,707

(22) Filed: May 10, 2013

(65) Prior Publication Data

US 2013/0301408 A1 Nov. 14, 2013

Related U.S. Application Data

(60) Provisional application No. 61/645,306, filed on May 10, 2012, provisional application No. 61/706,513, filed on Sep. 27, 2012.

(51) Int. Cl.
*H04L 12/28* (2006.01)
*H04L 12/851* (2013.01)
*H04L 12/801* (2013.01)

(52) U.S. Cl.
CPC ............... *H04L 47/24* (2013.01); *H04L 47/39* (2013.01)

(58) Field of Classification Search
USPC ................ 370/230–252, 311–338, 389–410; 709/204–229
See application file for complete search history.

(56) References Cited

U.S. PATENT DOCUMENTS

| | | | | |
|---|---|---|---|---|
| 6,754,188 | B1 * | 6/2004 | Garahi et al. ................. | 370/328 |
| 7,099,275 | B2 * | 8/2006 | Sarkinen et al. .............. | 370/230 |
| 7,487,240 | B2 * | 2/2009 | Proulx et al. .................. | 709/224 |
| 7,814,280 | B2 * | 10/2010 | Cummings et al. ........... | 711/147 |
| 7,822,886 | B1 * | 10/2010 | Miller et al. .................... | 710/29 |
| 7,916,718 | B2 * | 3/2011 | Loh et al. ........................ | 370/363 |
| 8,606,911 | B2 * | 12/2013 | Raleigh et al. ................ | 709/224 |
| 8,787,325 | B2 * | 7/2014 | Van Parys ..................... | 370/336 |
| 2008/0215681 | A1 * | 9/2008 | Darcie et al. .................. | 709/204 |
| 2010/0005176 | A1 * | 1/2010 | Verhoeyen et al. ........... | 709/227 |
| 2012/0177047 | A1 * | 7/2012 | Roitshtein ..................... | 370/392 |

* cited by examiner

*Primary Examiner* — Man Phan (57) ABSTRACT

A network device that processes a stream of packets has an ingress front end. The ingress front end determines whether the packets are handled in a bounded latency path or in a best-effort path. The bounded latency path packets are granted a resource with a higher priority than the best-effort path packets. As the packets are processed through a number of processing stages, with processing engines, the bounded latency packets are processed within a period of time corresponding to a guaranteed rate. Resources are granted to the best-effort path packets only when the processing engines determine that the resource grant will not impact the latency bounds with respect to the first packets.

19 Claims, 5 Drawing Sheets

HYBRID DATAFLOW PROCESSOR

CROSS-REFERENCE TO RELATED APPLICATIONS

The present disclosure claims priority from provisional application Ser. No. 61/645,306, filed on May 10, 2012, and from provisional application Ser. No. 61/706,513, filed on Sep. 27, 2012. The disclosures of these provisional applications are incorporated herein in their entirety by reference.

BACKGROUND

The current disclosure relates to a network device that processes packets.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A modern network device that processes packets typically includes processing units or "processing engines" serially arranged to process packets in what is understood as a pipeline configuration. In a pipeline configuration, packets are processed in stages so as to achieve a high rate of throughput.

SUMMARY

As an overview, the example embodiments discussed below generally relate to a network device that processes packets through a number of processing units using two paths: a "hard" path and a "soft" path. Packets that traverse the hard path are processed in a manner that provides bounded latency. Packets that traverse the soft path are processed in a best-effort manner. Notwithstanding the foregoing, not every example embodiment is required to possess all or even any of the features mentioned in this paragraph.

According to one example embodiment, there is provided a network device for processing packets, the device having an ingress front end configured to identify a first packet in a stream of packets as a packet to be processed with a guaranteed rate at each stage of a plurality of processing stages, and a second packet in the stream of packets as a packet to be processed without a guaranteed rate at each stage of the plurality of processing stages; a plurality of engines configured to provide a respective resource for use in processing the stream of packets at a processing stage; the processing stages being configured to: (1) for the first packet, selectively cause a first packet processing operation to be performed on the first packet using the resource obtained from one of the engines and to pass the first packet to the next processing stage within a period of time corresponding to the guaranteed rate; and (2) for the second packet, selectively request the resource from one of the engines for processing the second packet, buffer the second packet in a buffer until the resource is available, cause a second packet processing operation to be performed on the second packet using the available resource, and to pass the second packet to the next processing stage in at a rate that is not guaranteed.

In another example embodiment, the processing stages are arranged in a pipeline. In another example embodiment, the ingress front end, the engines, and the plurality of processing stages are disposed on a same integrated circuit device. The stream of packets includes a plurality of packets to be processed with the guaranteed rate of processing, and the one or more engines are configured to grant the resource, to the processing stage requesting the resource for the second packet, in response to determining that granting the resource to the second packet will not affect the guaranteed rate of the packets to be processed with the guaranteed rate. The ingress front end is configured, in an example embodiment, to provide data packets as a majority of the packets to be processed with the guaranteed rate to the plurality of processing stages.

The network device according to an example embodiment further includes a back pressure bus, wherein a downstream processing stage is configured to signal to an upstream processing stage, over the back pressure bus, whether the downstream processing stage is available to receive the second packet for additional processing. In another example embodiment, the downstream processing stage signals to the upstream processing stage whether to pass the second packet based on a buffer fill degree of the downstream processing stage. In response to a buffer of a downstream processing stage reaching a predetermined fullness threshold, the downstream processing stage sends a signal to an upstream processing stage to stop sending packets. In addition, the network device has soft path buffers disposed in the processing stages, the soft path buffers being configured to buffer the second packet for a variable period of time that is a function of a request to grant access to the resource from a processing stage to one or more of the engines and a grant by one or more engines to the requesting processing stage to make the resource available for processing the second packet.

In an example embodiment, the plurality of processing stages are arranged in a pipeline, and the soft path buffers are configured to provide a back pressure signal to a preceding stage indicating whether or not to send forward in the pipeline another packet to be processed without the guaranteed rate. In another example embodiment, the soft path buffer is configured to assert the back pressure signal in response to one of the soft path buffers exceeding a fullness threshold, and the ingress front end is configured to receive the back pressure signal and not send another packet to be processed without a guaranteed rate until the back pressure signal is de-asserted.

In yet another example embodiment, the plurality of processing stages are arranged to provide: a soft path which processes packets without a guaranteed rate; and a hard path which processes packets with a guaranteed rate irrespective of a processing load exerted on the engines the soft path.

In an example embodiment, there is provided a method including identifying a first packet in a stream of packets as a packet to be processed with a guaranteed rate at each stage of a plurality of processing stages; identifying a second packet in a stream of packets as a packet to be processed without a guaranteed rate at each stage of the plurality of processing stages; requesting at a processing stage a resource from an engine so that an operation can be performed on the first packet within a bounded period of time defined by predetermined latency corresponding to the guaranteed rate; executing a processing operation on the first packet using the resource, and passing the first packet to a next stage within a period of time defined by the guaranteed rate; requesting permission to request the resource from the engine so that an operation can be performed on the second packet; in response to a resource request, making a determination as to whether using the resource will affect the guaranteed rate of the first packet, and providing a resource grant in accordance with the determination; and in response to the resource grant, requesting the resource from the engine.

In an example embodiment, the method also includes buffering the resource request until the determination indicates the guaranteed rate of the first packet will not be affected.

In yet another embodiment, a network device is provided for processing a flow of first packets with substantially a guaranteed rate and for simultaneously processing a flow of second packets with a variable rate. The device also includes one or more engines supplying a processing resource for use in processing the first packets and for use in processing the second packets; and a processing stage coupled to the one or more engines, the processing stage being configured to: process the first packets using the resource obtained from the one or more engines within a time period defined by the guaranteed rate, and make a resource request for the resource for processing a second packet among the second packets, buffer the second packet until one or more of the engines indicates an availability of the resource for processing the second packet without causing the time period for processing the first packets to exceed the guaranteed rate.

In an example embodiment, there is provided a pipeline processor comprising a plurality of processing stages including the processing stage, the plurality of processing stages each configured to perform one or more processing operations on the first packets and the second packets. The device determines when to grant the resource based on whether the engine can grant the resource without affecting the guaranteed rate of the first packets. When there is a plurality of engines including the engine, each of the engines having a resource and being coupled to the processing stage, the processing stage being configured to generate a resource request with respect to more than one of the plurality of engines. In an example embodiment, the processing stage provides the resource request to each of the plurality of engines.

In an additional example embodiment, a network device also includes a packet classifier, disposed upstream of the processing stage and the engine, configured to classify a packet in a stream of packets as one of the first packets or one of the second packets.

DETAILED DESCRIPTION

In the following discussion, descriptions of well-known functions and constructions may be omitted for increased clarity and conciseness.

Conceptual Overview

Figure 1:
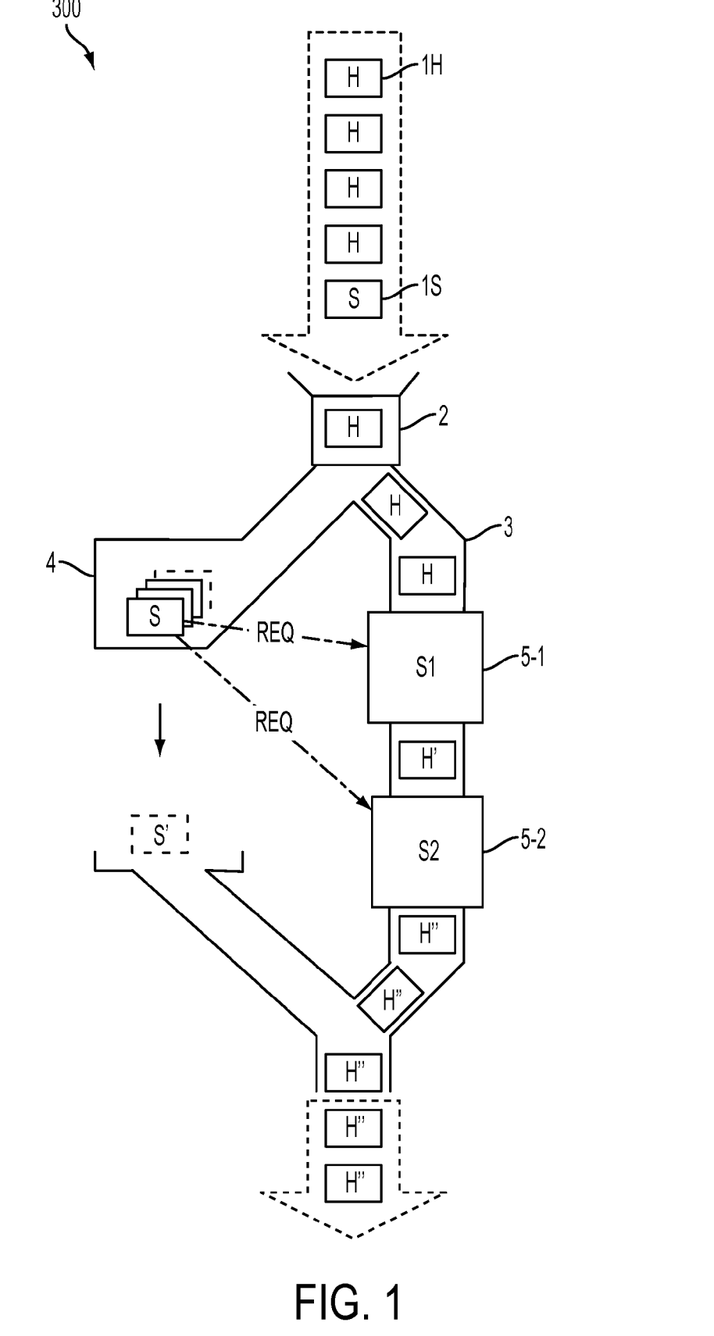
FIG. 1 is a highly simplified illustrative drawing to provide a high level overview of the concept of operation for according to example embodiments.

FIG. 1 shows a network device 300. A stream of network packets 1 is introduced. Some packets 1H are to be processed via the hard path, and some packets 1S are to be processed via the soft path. A component 2 in the device causes hard path packets 1H to be processed via the hard path 3, and causes soft path packets 1S to be processed via the soft path 4. It will be understood that the illustration of two physical paths in FIG. 1 and in other figures is provided for the sake of explanation, and is not to be understood as limiting the example embodiments.

The hard path packets 1H traverse the hard path 3 by passing through processing stages 5. In FIG. 1, only two stages are shown, 5-1 and 5-2. The processing stages are implemented by processing units and involve the use of various resources (not shown) which will be described in more detail below. Although the example embodiments do not require a change to a packet to occur as a consequence of each processing stage, FIG. 1 illustrates a change in packets by a change in the label H before processing stage S1 (i.e., 5-1) to the label H' afterward. Likewise, FIG. 1 shows the hard path packets that have been through processing stage S2 with the label H". After the final processing stage S2, the network packets thus processed egress.

The hard path packets 1H that traverse the hard path 3 are processed by the processing units (not shown) of the processing stages 5 in a manner that provides bounded latency. Here, the term "bounded latency" may be understood to have a connotation similar to "without delay" or similar to "at a guaranteed throughput rate".

The soft path packets 1S traverse the soft path 4. The soft path 4 is illustrated, for the sake of explanation only, as a figurative waiting line of soft path packets, waiting to be processed. Soft path packets 1S enter the soft path at the end of the line, and are eventually processed.

Some concrete example embodiments implementing a soft path are described below, but the overall concept is that the soft path packets 1S are processed in a best-effort manner. As shown in FIG. 1, the soft path packets 1S advance from a pre-processed state illustrated by the label S to a post-processed state illustrated by the label S'. While the change from S to S' is depicted simply by a solid line with a solid arrow, positioned between the waiting line and a dashed-line soft path packet 1S, it is to be understood that the resources which carry out the processing are the same resources that carry out the processing of the hard path packets 1H in the processing stages 5.

That is to say, processing stages 5 involve resources that are intended to process hard path packets 1H with bounded latency (i.e., without delay), but the idea is that these same resources are to be used to process the soft path packets 1S so long as the handling of the hard path packets 1H is not adversely impacted.

To that end, according to example embodiments, the device 300 is shown with the soft path 4 issuing requests ("Req" in FIG. 1) to the processing stages 5. The concept behind these requests is that they are to be handled at the discretion of the processing stages 5. Below, various other approaches are also discussed, but the idea is that the processing units of the processing stages 5 are in the best position to determine whether their respective processing workload permits the handling of the processing being requested on behalf of the soft path packets 1S.

Once the processing of a given soft path packet is performed, the processed packet S' may egress or be disposed of in any manner appropriate to the situation.

Looking deeper at the implications of bounded latency for hard path packets and best effort processing for soft path packets leads to some points to keep in mind as the discussion continues. First of all, delays cannot be tolerated in the hard path, and so it is likely that, from time to time, a few packets in the hard path will end up being dropped so that the great majority of packets can traverse the hard path within the bounds of permitted latency. On the other hand, since there is no particular time-wise expectation as to when a soft path packet will be processed, it would be relatively rare that a soft path packet would need to be dropped. At the risk of over-generalizing, it may be said that (in general) the hard path offers guaranteed timing but not guaranteed delivery, whereas the soft path offers guaranteed delivery but not guaranteed timing.

With this general framework in mind, the discussion below will focus, in turn, on (1) the terminology used in the remainder of this document, (2) an implementation of a hard path only network device (i.e., a network device with only a hard path), on (3) an implementation of a soft path only network device, and on (4) a "hybrid" network device having both a hard path and a soft path. The discussion will also move from the conceptual to the concrete so that a number of instructive, example embodiments are presented.

Terminology

This section of the discussion sets forth the technical terms that will be used to explain the example embodiments below.

Particular embodiments of the present disclosure relate to a network device having network and/or packet processors including a plurality of programmable processing units configured to process a stream of network packets. One example of such a processing unit which may be advantageously employed is a PACKET INSTRUCTION SET COMPUTER (PISC) processor available from MARVELL TECHNOLOGY GROUP, LTD.

The processing units are, in an example embodiment, arranged as a pipeline having serially arranged programmable processing stages configured to perform packet specific processing operations on packets in the stream of packets. One or more engine access points (EAP) are included in the pipeline among the programmable processing units and are configured to obtain specialized resources from one or more engines, such as lookup tables, accelerators and the like, that are external to the processing pipeline.

The pipeline interacts with one or more engines via the serially arranged EAPs. For example, an EAP can be used to send a request on behalf of a packet to an engine and to receive a corresponding response which can be integrated into the packet. The request sent on behalf of a packet is used for various packet-processing operations, such as accessing lookup tables and databases, which are performed using the engine's shared resources and accelerators which are outside the pipeline.

The stream of packets include, in an example embodiment, both hard path packets and soft path packets. One example of a packet type that is well suited for handling in the hard path is data packets. Data packets will typically be the most common and the most time-sensitive type of network packets, and the rapid movement of data is a worthwhile goal in any network.

One example of a packet type that is sensibly handled in the soft path is control message (CM) packets. CM packets typically do not need to be processed at a guaranteed rate and bounded latency and, therefore, are well suited to being handled on a best effort basis so as to not disturb the guaranteed rate and bounded latency of the hard path packets, in an example embodiment.

Compared to data packets, CM packets typically request access to an engine less frequently, for example because some CM packets perform more time-consuming table-management operations. Thus, in order to maximize throughput, data packets are allowed to use as much of the engine's capacity as possible. Additionally, in some embodiments, because CM packets are comparatively rare relative to data packets, reserve engine capacity is not allocated merely to service these packets.

It is easy to understand why data packets are generally well suited to handling via the hard path, and easy to understand why CM packets are generally well suited to handling via the soft path. Therefore, the discussion below will often use the term "data packets" instead of the term "hard path packets," and the term "CM packets" instead of the term "soft path packets." It is to be understood, however, that these terms are used only to simplify the reader's understanding. There may be situations in which a CM packet should be handled via the hard path, and there may be situations in which a data packet should be handled via the soft path. Moreover, there a numerous other types of packets that are not specifically discussed herein, and there are numerous types of packets that may be developed in the future.

Thus, the example embodiments discussed below in terms of "data packets" and "CM packets" should not be interpreted in a limitative sense but only in an instructive sense.

Hard Real-Time System

A hard real-time system has one or more hard-paths each having a fixed maximum latency and guaranteed performance. This means that a packet flowing through a hard real-time system will be processed within a certain amount of time that is determined at some stage during system design and/or production. Thus, each of the hard paths has a fixed resource allocation from among the resources of the engines so as to provide guaranteed performance at a guaranteed rate and bounded latency.

Figure 2:
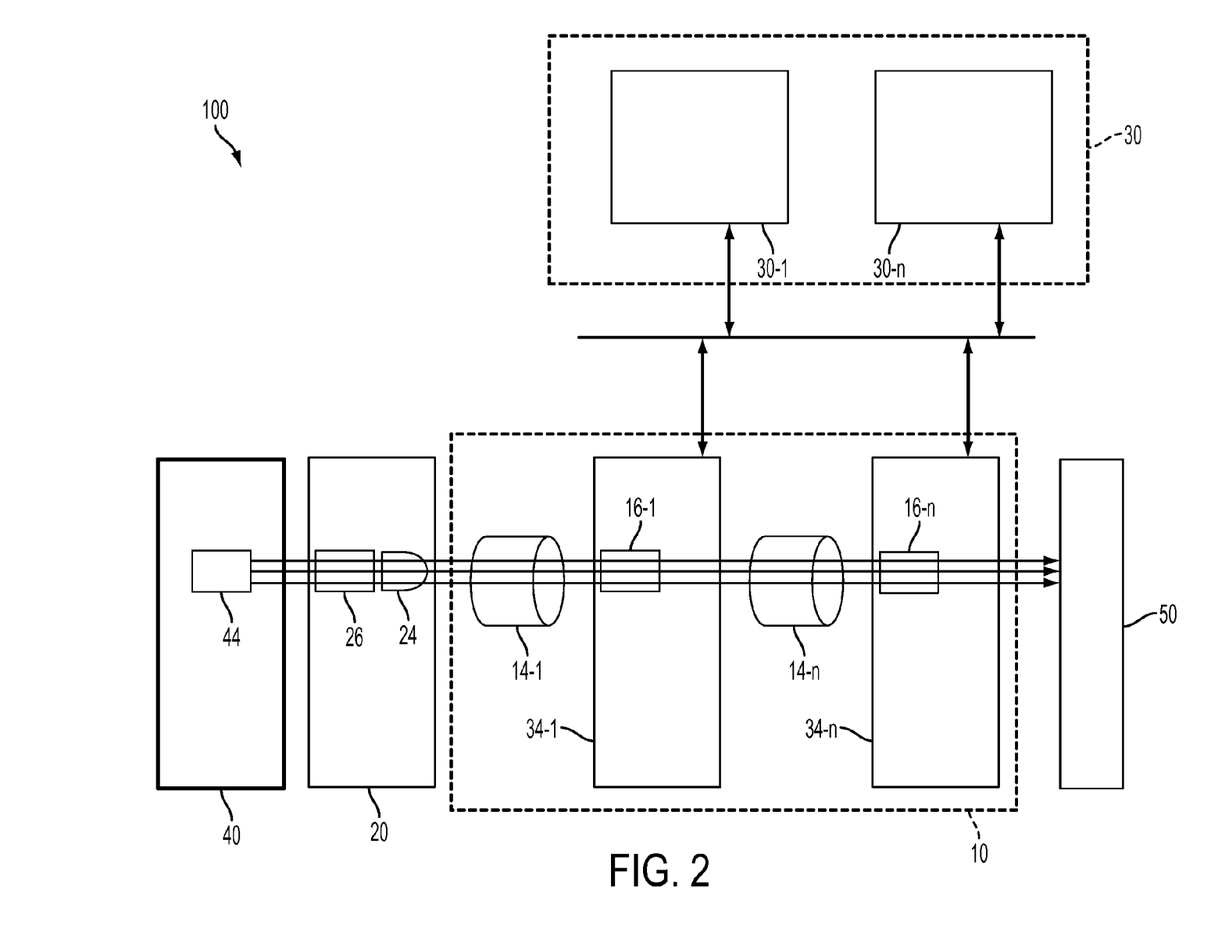
FIG. 2 illustrates a hard real-time system according to example embodiments.

FIG. 2 illustrates a hard real-time system 100 according to example embodiments of the present disclosure. The hard real-time system 100 includes a pipeline processor 10 disposed in a network processor unit or packet processor unit that in some embodiments is part of a network device such as a switch. As seen in FIG. 2, the packet processor 10 is in communication with a pipe arbiter 20 and engines 30-1 to 30-n that, in turn, are coupled to packet processor 10 by way of a bus. The pipeline processor 10 interacts with the engines 30 through engine access points (EAPs) 34-1 ... 34-n located at various stages of the pipeline processor 10. If the EAPs 34-1 ... 34-n are not distinguished from one another, they are simply referred to as the "EAP 34", also the number of EAPs 34 may be different than the number of the engines 30. The pipeline 10 includes one or more associated processor cores 14-1 ... 14-n, which if not distinguished from one another are simply referred to as the "processor core 14". In an embodiment the processing cores are programmable cores, such as PISC processing units, that are configured to perform a programmable context based processing operation on packets that flow through the pipeline. The EAPs 34 are a specialized I/O unit for classification tasks and can each request resources from the engines 30 to process a packet and receive a corresponding response which can be integrated into the packet using the associated processor cores 14-1 ... 14-n. In some embodiments, the EAP 34 also updates the packet context by itself without the use of the processor core 14.

More specifically, the EAPs 34 unify access to resources (e.g., look-up tables, control tables, forwarding tables, dedicated accelerators, etc.) stored in embedded or external memory (TCAM, SRAM, DRAM, etc.) of the engines 30 and receive context/code that is used by the associated processing cores 14-1 ... 14-n to process the packets as the packets flow through pipeline 10.

In this discussion, if the engines 30-1 to 30-*n* are not distinguished from one another, they are simply referred to in a general sense as the "engine 30". The pipe arbiter 20 receives packets, which are mostly data packets and also include some CM packets such as non-executable control messages (nXCM), from a traffic manager 40 that stores the packets in a buffer 44. As used herein, the term traffic manager 40 is a queuing system that can be as simple as a first-in first-out (FIFO) buffer to an advanced external buffering system including queues, a scheduling hierarchy and a buffer having a larger capacity than that of those of the pipe arbiter 20 and the pipeline 10. The traffic manager 40 may also be referred to herein as an ingress front end.

The pipe arbiter 20 stores the packets in a buffer 26 as they are received from the traffic manager, rate-shapes (i.e., pack rate-shapes) and schedules the packets for processing using a packet shaper 24, and feeds the packets to the pipeline processor 10 where they are processed, in an embodiment. More specifically, in an embodiment, at such time that code used to drive the various programmable processing cores is compiled into executable computer instructions, the rate shaper 24 checks the maximum utilization of the engines 30 by summing the worst case booking of the engines and ensuring that the worst case booking of an engine is less than its actual capacity. These rate-shaped and scheduled packets then traverse through pipeline processor 10 at a guaranteed rate and bounded latency. The rate-shaped and scheduled packets can be dropped in the hard real-time system in order to provide the guaranteed rate and bounded latency. More specifically, in a normal case when the hard path has guaranteed resources, the delivery, throughput rate and bounded latency of packets flowing through the hard path will be guaranteed. However, If any of the resources is over allocated for the hard path, hard path packets may be dropped so as to achieve guarantees for the majority of the packets. In contrast, if resources are over allocated for soft path, the packets will not be dropped. Instead they are buffered and wait for the resources to become available.

In some example embodiments, the pipeline processor 10 is formed of one or more Packet Instruction Set Computer (PISC) processor units, each of the PISC processor units receives at least partially processed packets, a processing context, and suitable code to perform a next processing operation. The PISC processor is a processor core specifically designed for packet processing, in an embodiment, although the present disclosure is not necessarily limited thereto and the pipeline processor 10 is, in an example embodiment, implemented as one or more general CPU or processor cores. In the hard real-time system 100 the packets cannot be re-ordered because they travel through the pipeline processor 10 as if advancing through a fixed-length first-in-first-out (FIFO) device with a guaranteed rate and bounded latency until they reach a sink 50, which in various embodiments is another pipeline processor, PISC, EAP, or the like suitable device. For example, in an embodiment, in each clock cycle, all packets in a hard path of the pipeline processor 10 shift one stage ahead to the next processor core 14 or EAP 34 at which a subsequent processing operation is executed. In this example, an instruction executed at a processor core 14 is always executed to completion within a single clock cycle and every instruction can execute up to a certain number (e.g., four) of operations in parallel. The packet then continues to the sink 50.

As mentioned above, however, there are, in an example embodiment, multiple hard paths in the hard real-time system 100. These multiple hard paths process packets in parallel, and it is possible for packets associated with one hard path to pass packets associated with another hard path within the hard real-time system 100.

Thus, as described above the hard real-time system 100 processes packets at a guaranteed rate corresponding to, for example, wirespeed, guarantees packet order, has a limited amount of buffers, and assumes worst case latency. It is noted that in an embodiment, only header, or other descriptor data structure representing a packet, is passed through the pipeline processor 10. Moreover, on average in a typical mix of packets having different processing requirements based on, for example, their respective size or length. By way of example, a packet having a size of 60 bytes has a higher packet rate than a packet having a size of 1,500 bytes. These packets may have the same processing requirement, e.g., program, but the frequency of the packets is different. For example, if there are many long packets the processing is mostly idle. In various embodiments, because of the need to maintain wirespeed processing for some packets, a significant portion of resources provided by the engines 30 may not be used at any given time. As a result, unused resources are available for processing relatively rare CM packets, and other similar packets that are not time bound.

Soft Real-Time System

A soft real-time system has one or more soft-paths each having a non-guaranteed rate and non-bounded latency, and profiling that is not guaranteed, in an embodiment. This means that a packet flowing through a soft real-time system will be processed at some time, but since there is no guaranteed rate and no bounded latency, the time at which the packet will be processed is not certain. That is, the packets flowing through the soft real-time system are processed on a best-effort basis using available resources without negatively impacting processing for instance, in the hard path.

Figure 3:
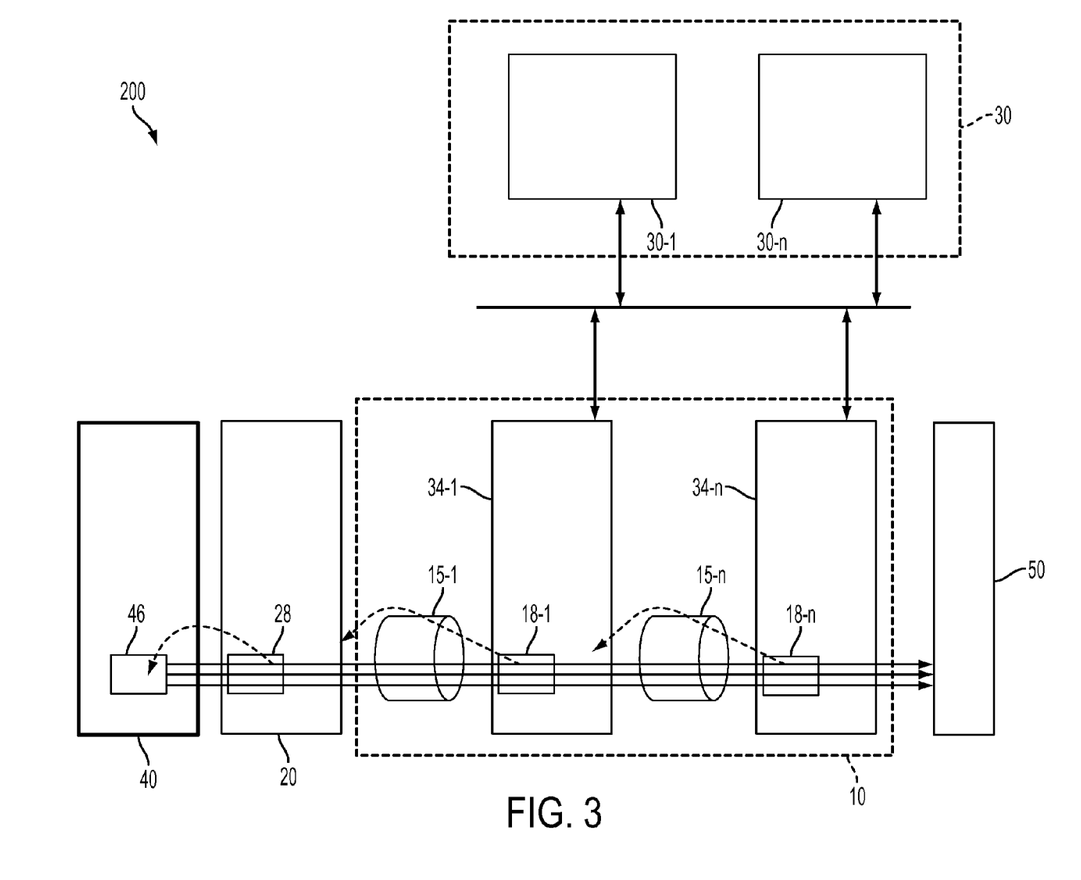
FIG. 3 illustrates a soft real-time system according to example embodiments.

FIG. 3 illustrates a soft real-time system 200 according to the example embodiments of the present disclosure. The soft real-time system 200 includes the pipeline processor 10, the pipe arbiter 20, the engines 30, the traffic manager 40, and the sink 50 described above, therefore redundant descriptions thereof are omitted.

In general, packets are stored on a first-in first-out (FIFO) buffer of the traffic manager until they are ingressed to the pipeline by the traffic manager 40, and passed from processor to processor. Moreover, when a packet reaches an EAP 34, and a resource from an engine 30 is required, a general process ensues. That is, the EAP 34 requests the resource and continues to buffer the packet until the engine signals availability. Once the engine signals availability, the EAP 34 can then obtain the resource from the engine 30.

Since the soft real-time system 200 does not have a guaranteed rate and bounded latency and the packets in the soft real-time system will not be dropped, there could be an occasion in which the soft path buffers 18-1 . . . 18-*n* of the EAPs 34 become full. Thus, while the hard real-time system is able to drop packets in order to provide the guaranteed rate and bounded latency, the soft real-time system is not designed to drop packets and will buffer a packet until it is able to be processed. The soft path buffers 18-1 . . . 18-*n*, when not being individually referred to, are simply referred to as the "soft path buffer 18".

Due to the possibility of the soft path buffers 18 becoming full, in some example embodiments, the EAPs 34 provide back pressure feedback (indicated by the dashed arrows) to previous EAPs 34 and to the pipe arbiter 20. Also, since the back pressure signal from the pipeline processor 10 causes the pipe arbiter 20 to stop sending packets to the soft path, the buffer 28 of the pipe arbiter 20 may also become full. Therefore, the pipe arbiter 20 is also able to provide a back pressure signal to the traffic manager 40 telling the traffic manager 40 to stop sending packets to the soft path. During the time that traffic manager 40 is not sending packets to the soft path, the packets accumulate in the deep soft path buffer 46 of traffic manager 40.

In some example embodiments, the back pressure signal is provided in the soft real-time system 200 via a separate back pressure bus (not shown).

In some example embodiments, other flow control schemes that that use a credit based system rather than the back pressure are used. These credit based systems are described later.

In the soft real-time system 200, unlike the above-described hard real-time system 100 and traditional soft paths, the pipe arbiter 20 does not try to predict when there will be gaps that allow the CM packets to be piggy-backed and go in-band with the data packets. That is, since there is no guaranteed rate and bounded latency the pipe arbiter 20 does not rate-shape the packets, but rather sends them to pipeline 10 for processing in response to receiving signal indicating that the pipeline is available to process a next packet.

Although the pipe arbiter 20 does not need to rate-shape and schedule the packets for its own purposes, it is possible to add rate shaping and/or scheduling when some other consideration requires it. However, the pipe arbiter 20 should schedule the packets, in order to support multiple hard path and multiple soft paths. If there the back pressure signal is de-asserted or no packet in any of the hard paths, then the packet can be scheduled into the soft path. When there are multiple soft paths, the pipe arbiter 40 schedules packets for the different soft paths by e.g., a round robin scheduling scheme.

The pipe arbiter 40 feeds the packets to the pipeline processor 10 when not prohibited by a back pressure signal. Further, inasmuch as the soft paths do not have the fixed resource allocation of hard paths, the soft paths use the engine's resources as they become available.

In a case where only the soft paths are used, however, it is not possible to give any rate/latency guarantees other than statistical performance.

Hybrid Device

Therefore, according to an example embodiment there is realized a hybrid system including both the above-mentioned hard real-time system 100 and the above-mentioned soft real-time system 200, combined over the same resources. The hybrid system gives the best of both systems and allows programs that need guarantees (e.g., Committed Packet Programs (CPP) programs) to get that by traversing the hard path, while also allowing programs that do not need guarantees (e.g., Excessive Packet Programs (EPP) programs) to access an engine's 30 resources as they become available via the soft path. As a result, the hard path can reduce extra latency/buffering due to the occasional costly CM packets and the soft path has a much simpler regulation mechanism for CM packets.

Hybrid System

Figure 4:
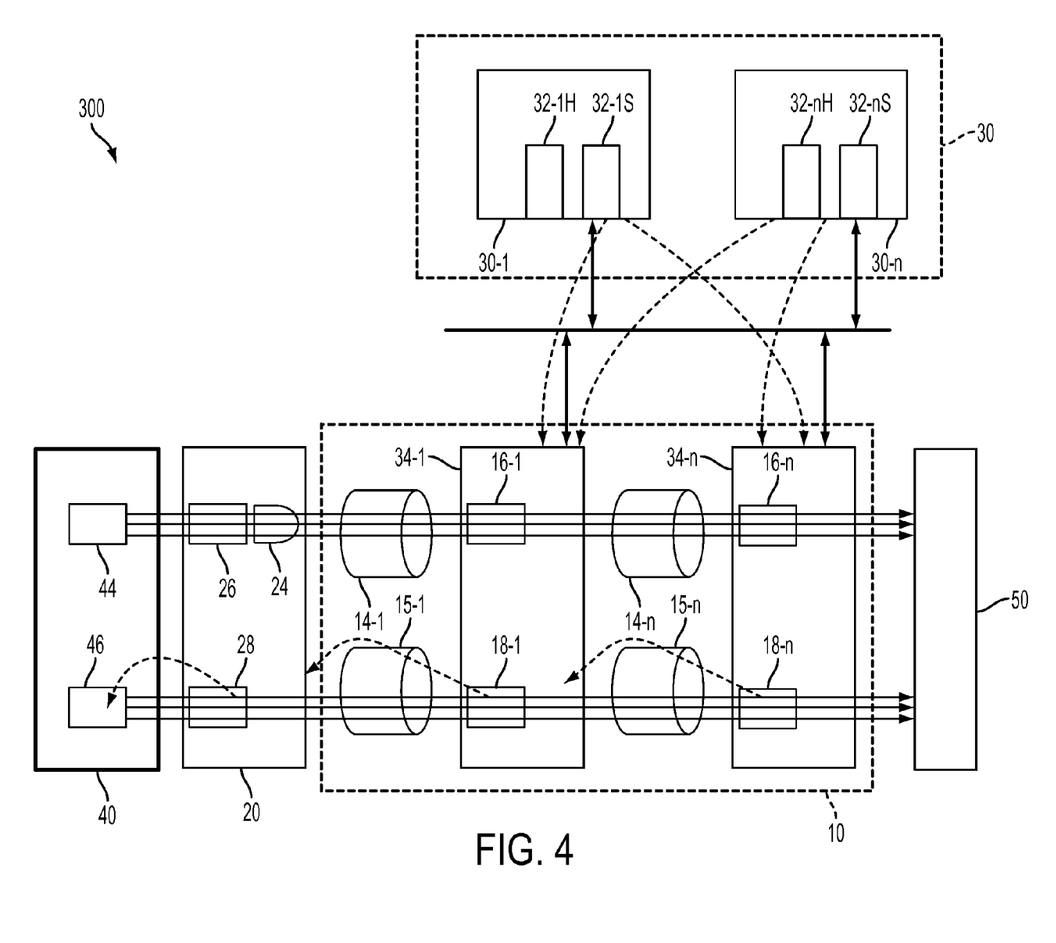
FIG. 4 illustrates a hybrid system, which has the hard real-time system of FIG. 2 and the soft real-time system of FIG. 3, according to example embodiments.

FIG. 4 illustrates an example hybrid system 300. The engines 30 of the hybrid system 300 have separate (logical) buffering systems (queues) for the hard real-time system 100 and for the soft real-time system 200. For example, the engine 30-1 includes a local hard-time buffer 32-1H and a local soft-time buffer 32-1S, and each of the engines 30 includes a respective local hard-time buffer and a respective local soft-time buffer.

In the hybrid system, the hard real-time system 100 has priority over the soft real-time system 200. This is because the hard real-time system 100 has a guaranteed rate and bounded latency whereas the soft real-time system 200 does not have a guaranteed rate and bounded latency.

Mechanisms for Path Selection

The traffic manager 40 directs the packets that do not need a guaranteed rate and a bounded latency to the soft path buffer 28 in the pipe arbiter 20. These packets are mainly CM packets, however, this disclosure is not limited thereto and the soft path buffer 28, in an example embodiment, receives data packets as well. Similarly, the traffic manager 40 directs the packets that do need guarantees to the hard path buffer 26 of the pipe arbiter 20. These packets are mainly data packets, however, this disclosure is not limited thereto and the hard path buffer 26, in an example embodiment, receives CM packets as well.

In an example embodiment, the traffic manager 40 is an advanced buffer system with multiple queues mapped to an egress port. All the packets stored in the queues mapped to the egress port will be processed in a same soft path or a same hard path. That is, there is mapping between an egress port of the traffic manager 40 and an input of the soft and hard paths. In some embodiments, the traffic manager 40 receives packets from via an ingress port, stores the packets in its buffer system, and transmits the packets to the pipe arbiter 30. The traffic manager 40 is not required to do any processing selection because the processing selection has already been done either by static mapping from one ingress port to a queue, or by a pre-classifier that by a lookup (in e.g. TCAM) on the packet selects one queue in the traffic manner 40.

The traffic manager 40 only selects (schedules) which packets in its buffer system/queues to send to the egress port without respect to the type of processing required by the packets.

In another example embodiment, the traffic manager 40 includes a first-in first-out (FIFO) buffer for each of the hard paths and soft paths.

The traffic manager 40, in an example embodiment, directs the packets to the respective hard and soft paths using various techniques such as static choice, dynamic choice by service class, and dynamic choice by traffic frequency, each of which is described below.

In the static choice technique, according to an example embodiment, upon arrival of a packet at the traffic manager 40 it is determined whether the packet needs to be sent to the hard path or to the soft path. Specifically, candidates for the hard path include those needing guaranteed wire speed performance or that need to be performed within a specified time. Examples of these candidates include data traffic, regular OAM ping programs, and some management packets for executing programs such as a table scrub or programs for detecting timeouts.

Candidates for the soft path include those that simply need "best effort" performance. Examples of these candidates include management packets such as packets that update table entries or packets that read counters.

In the dynamic choice by service class, according to an example embodiment, there is a classification using the pipeline processor 10. In the first pass of a packet through the pipeline processor 10, data traffic is used for classification of the packet, e.g., hard path for wirespeed. The packet is passed through another pipeline processor 50 or looped through the same pipeline processor 10 and enter the hard path or the soft path depending on the earlier classification. Also a set of TCAM or SIP (e.g., hard coded switch) like pipeline can perform the classification.

Candidates for the hard path in the second pass include packets with rate-sensitive and latency-sensitive service classes. Examples include system control packets, VoIP, gaming, conferencing, etc. Candidates for the soft path in the second pass include packets that are neither rate-sensitive nor latency-sensitive service classes. Examples include VoD, data traffic, scavenger class packets, etc.

In the dynamic choice by traffic frequency, according to an example embodiment, there is a classification similar to that described above with respect to the dynamic choice by service class technique. Candidates for the hard path in the second pass include bulk traffic, e.g., Layer 2 (L2) Ethernet traffic. Candidates for the soft path in the second pass include relatively rare types of traffic that should be managed but that one may not want to provide with optimized resources, e.g., Layer 3 (L3) Ethernet traffic.

Mechanism for Requesting Resources

In the hard path, when the packets arrive at the buffers 16 of the EAPs, the EAPs simply request resources on behalf of the packets. These requests are stored in the engine's hard path buffer 32-H and they are executed in the order they are received by the engines 30.

In contrast, when the back pressure signal is not present, e.g., when the back pressure signal is de-asserted, the soft path buffer 28 pushes packets stored thereon to the pipeline processor 10. Upon arriving at the pipeline processor 10 these packets are stored in the soft path buffer 18 of the EAP 34. In response to receiving a packet in the soft path buffer 18, the EAP 34 sends a "request to grant" to one or more of the engines 30. In response to receiving the request to grant, the engines 30 determine whether or not they have available resources that may be used without disrupting the flow of packets in the hard path. In response to determining that there are available resources that may be utilized without disrupting the flow of packets in the hard path, an engine 30 sends a "grant" to the EAP 34. In response to receiving the grant from the engine 30, the EAP 34 then requests a resource from the engine that sent the grant and the request is stored in the soft path buffer 32-S of the engine and executed in the order that it was received by the engine 30. The "request to grant" may be thought of as a resource request, and the "grant" may be thought of as a resource grant.

The engines 30 determine whether or not they have available resources based on its current congestion status, by for example, at least one of the buffer fill degree, semaphores, outstanding credits, other local resources, etc., and can therefore make a correct decision quickly as to whether or not they have available resources. Thus there is no need to try to predict the engine congestion from the pipe arbiter 20. As a result, the non-used bandwidth from all EAPs 34 can be available for the soft-path.

A request to grant received from the soft path is enqueued in separate queue(s) at the engine. As described above, the engines each include a hard-path buffer 32-H and a soft-path buffer 32-S. In other words, the soft-path has a queue structure parallel to that of the hard path, in an embodiment. This is so that a request to consume the engine's 30 resources can be held pending, for the soft path, without disturbing the packet flow in the hard-path.

Since the engines 30 are distributing their resources to the EAPs 34 they each act as a broker for the EAPs 34. The engines 30 can regulate the distribution of their resources in several different ways.

In one example embodiment, the engines 30 regulate the distribution of their resources by providing a back pressure signal to each of the EAPs 34 via a separate back pressure bus (not shown). Thus, in this embodiment, the engines 30 need a queue per EAP or the acceptance of head-of-line blocking. Therefore, the potential exists for the queues to become large due to unstoppable data, and the rate depends on the round-trip. That is to say, the engine 30 achieves a higher buffer fill, e.g., so that multiple EAPs 34 may send simultaneous requests during the same clock cycle. If the transport latency between the EAP 34 and the engine 30 is more than one clock cycle, then more than one request to the engine 34 to the engine can be sent before the back pressure signal can asserted so as to stop the EAP from sending more packets, e.g., "unstoppable data".

In another example embodiment, the engines 30 regulate the distribution of their resources via credits. The credits correspond to a buffer position at the engine 30 and the rate depends on the amount of credits the EAP 34 is given. For example, an EAP 34 requests for one or more credits, then when the engine can grant a credit the requesting EAP 34 it does so. Next, when the EAP 34 receives the credit it sends a request for the resource to the engine 30. The engine returns credits to the EAP 34 when consumed. This can be achieved by piggy backing the credit with the response or via a separate bus.

In one example embodiment, the engine 30 grants credits to the EAP(s) 34 that requested a credit, if there is buffer space in the soft buffer 32-S of the engine 30. A credit corresponds to an entry in the soft request buffer. The engine 30, in one example the engine, has a counter (not shown) for each EAP 34 (or similar client) in order to keep track of the number of credits currently needed by each EAP 34. The EAP 34 may request a credit from an engine 30 by a signal on a separate bus (increasing a count of the associated counter by, for example, +1). The engine 30 may also have a broker (not shown) that selects which EAP 34 to grant a credit to in a round robin among all EAP 34 that requested a credit. The present disclosure is not limited to a round robin scheme and can also include a weighted round robin scheme, a most outstanding credits first scheme, e.g., the largest queue first, a strict priority scheme, etc.

When an EAP 34 is selected its request counter is decreased by, for example, −1. The engine 30 may grant multiple credits to the same EAP 34 or different EAPs 34 in order to get higher throughput. When the engine requests are consumed and processed by the engine 30, it frees up the soft buffer 32-1 thereby making the credits available again to be distributed by the broker. The engine 30 sends credit grants with a signal on a separate bus to the EAP 34. A counter increases by, for example, +1, which means that the EAP 34 is permitted to request that number of engine resources from the engine and when the request is actually transmitted to the engine 30 the counter is decreased by same amount, for example, −1.

For example, the broker keeps track of the available credits. The broker starts by having X credits corresponding to the number of entries in the soft buffer and when the broker grants credits to the EAPs 34, the available credits are decreased. The broker does not grant credits such that the available credits become negative. When an engine request stored in the engine's soft request buffer 32-S, is consumed by the engine 30 it frees one entry in the soft request buffer 32-S. Then a number of the broker's available credits increases, and the credit is available to be distributed by the broker to one of the EAPs 34 again.

In another example embodiment, the engines 30 regulate the distribution of their resources via a request grant scheme using a separate request/grant bus (not shown). For example, an EAP requests a number of credits and the engine grants a number of credits to the EAP if it can accept the requests without disturbing the stream of packets on the hard-path. In this example embodiment, the rate depends on round-trip time, which can be improved by granting multiple credits at a time.

In these embodiments, if the credits are distributed according to the current need, then the engine's 30 soft-path buffer 32-S and engine capacity could be utilized more efficiently when compared to the related art. As described, the engines 30 according to the example embodiments can act like a broker and distribute their respective resource capacity according to the need.

In addition, in some example embodiments, the engines 30 regulate the rate by adapting the amount of credits granted to each of the EAPs 34. In these embodiments, the adaptive scheme is based on a particular send frequency of an EAP 34. For example, by sending a periodic credit update via a credit bus (not shown) where credits that are not used are lost when a new update arrives or by sending periodic adaptions {+,-, 0}.

Furthermore, a specialized request-grant engine is used, in an example embodiment, to implement the broker by, for example, granting requests in a round-robin type fashion among all EAPs 34 currently requesting a grant to request.

In an alternative embodiment, there is provided a dynamic grant request scheme. In this embodiment, if an EAP 34 needs to send N requests on behalf of packets in the soft path to the engine 30, the EAP will request N grants to requests from the engine 30. The engine 30 will then send up to N grants to request to the EAP 34 based on its currently processing load. In response to receiving the up to N grants to request, the EAP transmits that many requests to the engine 30 where they are stored in the soft path buffer 32-S until they are able to be executed without disturbing the flow of packets in the hard path.

To better understand this dynamic grant request scheme assume that an EAP 34 can only request 1 credit at a time, for simplicity of explanation. Thus, the EAP 34 needs to use the credit before it requests a new one.

The EAP 34, in an example embodiment, keeps track of the states per engine based on the granted requests (N). When all granted requests are sent to the EAP 34, then the EAP requests a new credit. In a case where there are multiple channels, the EAP 34 submits a request to grant to multiple engines 30 on behalf of a packet in the soft path. In this case the EAP either needs to obtain a grant from all the engines 30 to which the request to grant was submitted before sending the request, or the EAP 34 sends the request as soon as it is granted and then waits on all the responses before proceeding to the next stage of the pipeline processor 10. Waiting on all responses before proceeding to the next stage of the pipeline processor 10 makes better use of resources by reducing a time that credits are occupied to be as small as possible. In a case where there are multiple engines 30, if there is only one request at a time there is only one state per channel and the simple solution is to only grant one credit at a time. This is because there is no need to keep track of a later packets pending engine usage. Since the EAP in this dynamic grant request scheme cannot request credits without actually having something to send to the engines 30 so as to avoid losing credits, this scheme does not require supporting separate N states per engine 30.

To better understand the dynamic grant request scheme from the viewpoint of the engines 30, assume that there are multiple outstanding credits to each engine 30, thus overcoming the channel bus latency and thereby only being limited by the request-grant latency of the soft path. Regarding the states per engine, if M is the current number of available credits which are free for filling up the soft path buffer 32-S and N is the number of current outstanding granted credits, then when a request is consumed by the engine 30 M increases by 1. Similarly, when a request is received from an EAP 34 then M is decreased by 1. When a credit is granted by the engine 30 then N increases by 1 and when a request is received by the engine 30 from the EAP then N decreases by 1.

Based on the above, M should be greater than or equal to N at all times in this scheme, except when M less than 0, which means there is a buffer overflow, and when N is less than 0, which means that there has been an unexpected request.

When an EAP 34 wants to be part of the request scheduling, then it sets a pending request flag. To understand the states per EAP 34 in this scheme assume that G is an outstanding granted request. G is increased by 1 if a request is granted. G is decreases by 1 if a request is received. N is equal to G except when G is less than 0 meaning that there has been an unexpected request.

The engines, in one example embodiment, use time-out (T) to protect against lost requests. T is MAX when a new request is granted. The value of MAX is arbitrarily set so as to be certainly an error but not so large that instability would occur. T is reduced by, for example, 1 each clock cycle.

When M is greater than 0, then the engine can grant requests and, to fulfill requests, a round robin between the EAPs 34 with pending requests is implemented according to an example embodiment.

In another example embodiment, there is a static credit-based soft path. In this embodiment, the soft path relies on a static credit system where credits are distributed at compile time. For the engine 30, B is equal to the total number of credits corresponding to the soft-path buffer 32-S. At compile time the credits C are distributed among the EAPs such that the sum of C is less than B thereby preventing the possibility that he soft path will interfere with the packet flow in the hard path. In one exemplary embodiment, an EAP is assigned more than one credit at a time to get high through-put and thereby overcoming channel bus latency.

Multiple Flows

As described, the hard path, by itself, works like a conventional processing pipe and thus the hard real-time system 100 is not required to have more than one hard path. However, it is understood that this disclosure is not limited thereto and that, in example embodiments, there is more than one hard path, as indicated by the multiple lines flowing from the traffic manager 40 to the sink through the hard real-time system 100 in FIGS. 1 and 3.

The soft-path, on the other hand, benefits from different flows, e.g., for different applications, that can process independently from one another e.g., if they use different engines 30. That is, according to example embodiments, there is more than one soft path, as indicated by the multiple lines flowing from the traffic manager 40 to the sink 50 through the soft real-time system 200 in FIG. 3.

The hybrid systems 300 described herein are, in example embodiments, embodied as a system on a chip (SOC) where each of the above described components is provided on the same chip. The hybrid systems, in example embodiments, are embodied as a SOC where at least the pipeline processor 10 and engines 30 are provided on the same chip and other components that are not provided on the same chip are provided as discrete components, as other systems on chips, or any combination thereof. These hybrid systems 300, according to example embodiments, are embodied as entirely discrete components that are connected via an internal network (bus structure/system bus), or the like.

Figure 5:
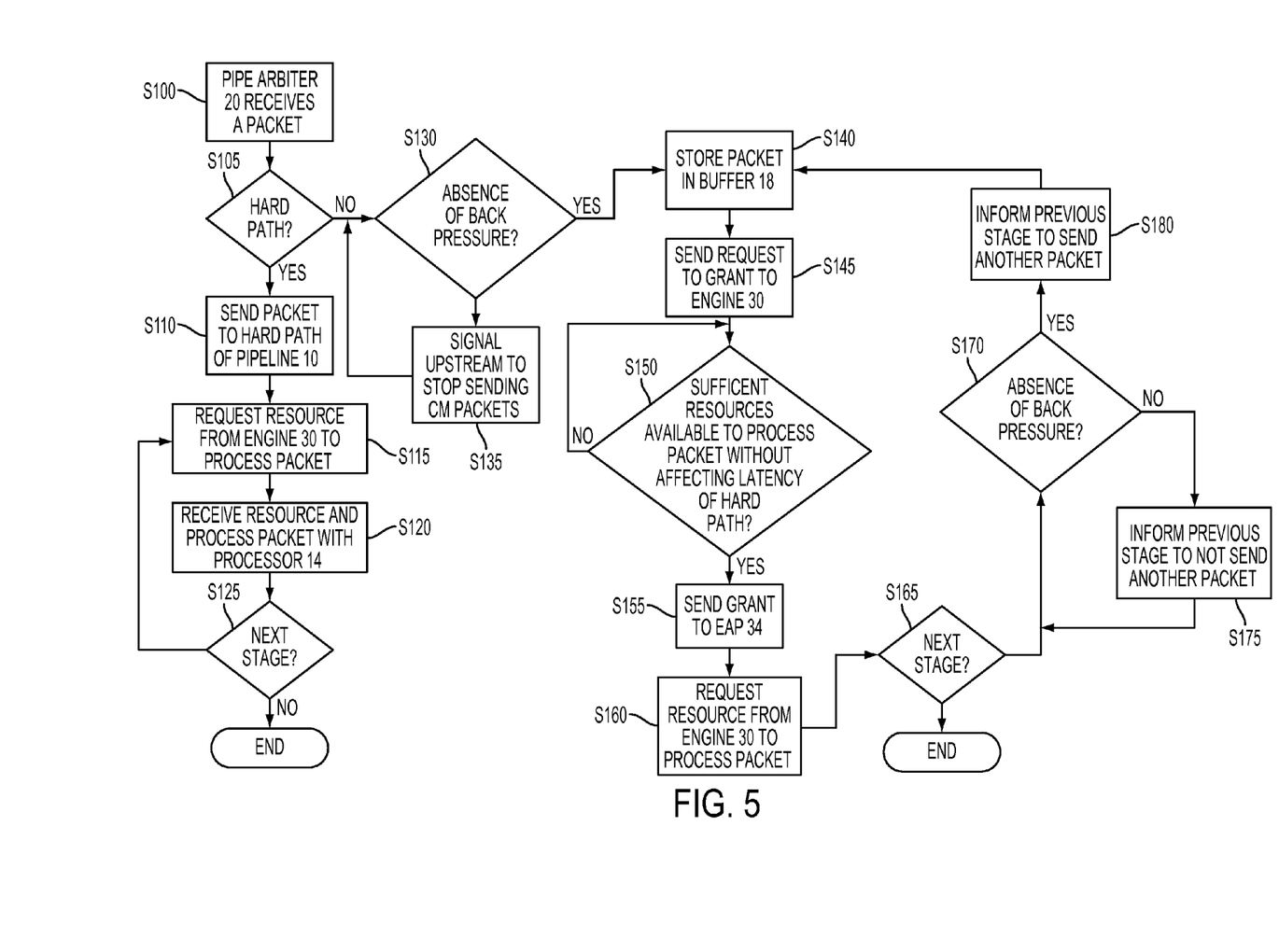
FIG. 5 illustrates a flow chart of an example method according to example embodiments.

FIG. 5 illustrates flow chart of an example method according to example embodiments described herein. At S100 the pipe arbiter 20 receives a packet and at S105 it is determined whether or not the packet is to be processed in the hard path or not.

At S110, in response to determining that the packet is to be processed in the hard path, the pipe arbiter 20 sends the packet to the hard path of the pipeline 10. At S115, in response to the packet arriving at the hard path of the pipeline 10, the EAP 34 requests a resource from the engine 30 in order to process the packet. At S120, in response to receiving the resource from the engine 30, the EAP processes the packet with use of the processor 14. At step S125, if there is another processing stage in the pipeline 10, then the process repeats beginning with S115. Otherwise, if there is no next stage, then the processed packet is sent to the sink 50 and the process ends for that pipeline 10.

At S105, in response to determining that the packet is not to be processed in the hard path (e.g., it is destined for the soft path), the pipe arbiter 20 sends the packet to the soft path of the pipeline 10. At S130, in response to determining that the packet is not to be processed in the soft path, the network device buffers the packet in the pipe arbiter 20 unless the back pressure signal is present or asserted. That is, in the absence of back pressure, i.e., when the back pressure is de-asserted, the packet is buffered in the pipe arbiter 20. At S135, in response to determining that the back pressure signal is present or asserted, the soft real-time system 200 signals upstream to request that the traffic manager 40 stop sending packets to be processed in a soft path. This back pressure signal remains asserted until the system back pressure allows the packet to be sent to the pipeline 10 to be stored in the soft path buffer 18.

At S140, in response to receiving the packet on the soft path, the packet is buffered in buffer 18. At S145, in response to storing the packet in the buffer 18, the EAP 34 sends a request to grant to the engine 30.

At S150, in response to receiving a request to grant from the EAP, the engine 30 determines whether or not there are sufficient resources available to process the packet without affecting the latency of the hard path. In response to determining that there are not enough resources available to process the packet without affecting the latency of the hard path, the request to grant is buffered in the soft path buffer 32-S of the engine 30 until the request can be granted. If the soft path buffer 32-S exceeds a predetermined fill level threshold, then it provides or asserts a back pressure signal to the soft real-time system to prevent more packets from being sent to the soft path until the soft path buffer's 32-S fill level falls below the predetermined fill threshold.

At S155, in response to determining that there are enough resources available to process the packet without affecting the latency of the hard path, the engine sends a grant to the EAP 34. At S160, in response to receiving the grant, the EAP requests the resource from the engine 30 in order to process the packet.

At S165, in response to processing the packet, it is determined whether or not there is another stage in the pipeline 10. If there is not another stage, then the process for that packet in this pipeline 10 ends. Otherwise, if there is another stage, then at S170, the soft real-time system determines whether back pressure signal is de-asserted so as to allow the packet to be buffered in the next stage.

At 175, in response to determining that the back pressure is asserted so as to not allow the packet to be buffered in the next stage, the soft real-time system 200 signals the upstream stages to not send another packet and the soft real-time systems continues to monitor the back pressure signal until the back pressure signal is de-asserted so as to allow the packet to be sent to the next stage. At 180, in response to determining that the back pressure signal is de-asserted so as to allow the packet to be buffered in the next stage, the soft real-time system 200 signals the upstream stages to send another packet and the packet is stored in the buffer 18 of the next stage thereby looping the process back to S140.

Conclusion

Although the inventive concept has been described above with respect to the various embodiments, it is noted that there can be a variety of permutations and modifications of the described features by those who are familiar with this field, without departing from the technical ideas and scope of the features, which shall be defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward packets, transmit various address resolution messages, and update address caches and packet addresses in the manner described in the present disclosure with respect to various embodiments. Accordingly, other implementations are within the scope of the following claims.

There is claimed:

1. A network device for processing packets, the network device comprising:
    an ingress front end configured to identify (i) a first packet in a stream of packets as a packet to be processed with a guaranteed rate at each processing stage of a plurality of processing stages that are programmable, and (ii) a second packet in the stream of packets as a packet to be processed without a guaranteed rate at each processing stage of the plurality of processing stages;
    a plurality of engines configured to provide a respective resource for use in processing the stream of packets at a processing stage, the resource being external to the plurality of processing stages;
    the plurality of processing stages are arranged in a pipeline and configured to:
        (i) for the first packet, selectively cause a first packet processing operation to be performed on the first packet using the resource obtained from one of the engines and to pass the first packet to the next processing stage within a period of time corresponding to the guaranteed rate; and (ii) for the second packet, selectively request the resource from one of the engines for processing the second packet, buffer the second packet in a buffer until the resource is available, cause a second packet processing operation to be performed on the second packet using the available resource, and, in response to receiving a backpressure signal from downstream in the pipeline indicating an ability to forward the second packet to the next processing stage in the pipeline, to pass the second packet to the next processing stage at a rate that is not guaranteed.

2. The network device for processing packets according to claim 1, wherein the ingress front end, the engines, and the plurality of processing stages are disposed on a same integrated circuit device.

3. The network device for processing packets according to claim 1, wherein the stream of packets includes a plurality of packets to be processed with the guaranteed rate of processing, and the one or more engines are configured to grant the resource, to the processing stage requesting the resource for the second packet, in response to determining that granting the resource to the second packet will not affect the guaranteed rate of the packets to be processed with the guaranteed rate.

4. The network device for processing packets according to claim 3, wherein the ingress front end is configured to provide data packets as a majority of the packets to be processed with the guaranteed rate to the plurality of processing stages.

5. The network device according to claim 1, further comprising a back pressure bus, wherein a downstream processing stage is configured to signal to an upstream processing stage, over the back pressure bus, whether the downstream processing stage is available to receive the second packet for additional processing.

6. The network device according to claim 5, wherein the downstream processing stage signals to the upstream processing stage whether to pass the second packet based on a buffer fill degree of the downstream processing stage.

7. The network device according to claim 1, wherein, in response to a buffer of a downstream processing stage reaching a predetermined fullness threshold, the downstream processing stage sends a signal to an upstream processing stage to stop sending packets.

8. The network device according to claim 1, further comprising soft path buffers disposed in the processing stages, the soft path buffers being configured to buffer the second packet for a variable period of time that is a function of a request to grant access to the resource from a processing stage to one or more of the engines and a grant by one or more engines to the requesting processing stage to make the resource available for processing the second packet.

9. The network device according to claim 8, wherein the soft path buffers are configured to provide the back pressure signal to a preceding processing stage indicating whether or not to send forward in the pipeline another packet to be processed without the guaranteed rate.

10. The network device according to claim 8, wherein, the soft path buffer is configured to assert the back pressure signal in response to one of the soft path buffers exceeding a fullness threshold, and wherein the ingress front end is configured to receive the back pressure signal and not send another packet to be processed without a guaranteed rate until the back pressure signal is de-asserted.

11. The network device according to claim 1, wherein the plurality of processing stages are arranged to provide:

a soft path which processes packets without a guaranteed rate; and a hard path which processes packets with a guaranteed rate irrespective of a processing load exerted on the engines the soft path.

12. A method comprising:

identifying a first packet in a stream of packets as a packet to be processed with a guaranteed rate at each processing stage of a plurality of processing stages that are programmable and arranged in a pipeline;

identifying a second packet in a stream of packets as a packet to be processed without a guaranteed rate at each processing stage of the plurality of processing stages;

requesting at a processing stage a resource from an engine so that an operation can be performed on the first packet within a bounded period of time defined by predetermined latency corresponding to the guaranteed rate, the resource being external to the plurality of processing stages;

executing a processing operation on the first packet using the resource, and passing the first packet to a next processing stage within a period of time defined by the guaranteed rate;

requesting permission to request the resource from the engine so that an operation can be performed on the second packet;

in response to a resource request, making a determination as to whether using the resource will affect the guaranteed rate of the first packet according to a backpressure signal from downstream in the pipeline indicating whether or not to send forward in the pipeline another packet to be processed without the guaranteed rate, and providing a resource grant in accordance with the determination; and in response to the resource grant, requesting the resource from the engine.

13. The method of claim 12, further comprising buffering the resource request until the determination indicates the guaranteed rate of the first packet will not be affected.

14. A network device for processing a flow of first packets with substantially a guaranteed rate and for simultaneously processing a flow of second packets with a variable rate, the network device comprising:

one or more engines supplying a processing resource for use in processing the first packets and for use in processing the second packets; and a plurality of processing stages arranged in a pipeline and coupled to the one or more engines and external to the resource, the plurality of processing stages being programmable and configured to:

process the first packets using the resource obtained from the one or more engines within a time period defined by the guaranteed rate, make a resource request for the resource for processing a second packet among the second packets, buffer the second packet until one or more of the engines indicates an availability of the resource for processing the second packet without causing the time period for processing the first packets to exceed the guaranteed rate, and in response to receiving a backpressure signal from downstream in the pipeline indicating an ability to forward the second packet to the next processing stage in the pipeline, to pass the second packet to the next processing stage at a rate that is not guaranteed.

15. The network device according to claim 14, wherein the plurality of programmable processing stages are each configured to perform one or more processing operations on the first packets and the second packets.

16. The network device according to claim 15, wherein the engine determines when to grant the resource based on whether the engine can grant the resource without affecting the guaranteed rate of the first packets.

17. The network device according to claim 14, further comprising a plurality of engines including the engine, each of the engines having a resource and being coupled to the processing stage, the processing stages being configured generate a resource request with respect to more than one of the plurality of engines.

18. The network device according to claim 17, wherein the processing stages provide the resource request to each of the plurality of engines.

19. The network device according to claim 14, further comprising a packet classifier, disposed upstream of the processing stage and the engine, configured to classify a packet in a stream of packets as one of the first packets or one of the second packets.

\* \* \* \* \*